May 18, 1937.   R. W. LEUTWILER ET AL   2,080,666
PRESSURE REGULATING VALVE
Filed Feb. 15, 1936   2 Sheets-Sheet 1

Inventors
Richard W. Leutwiler
+ William Eicholz,
by Rummler Rummler & Woodworth
Atty's.

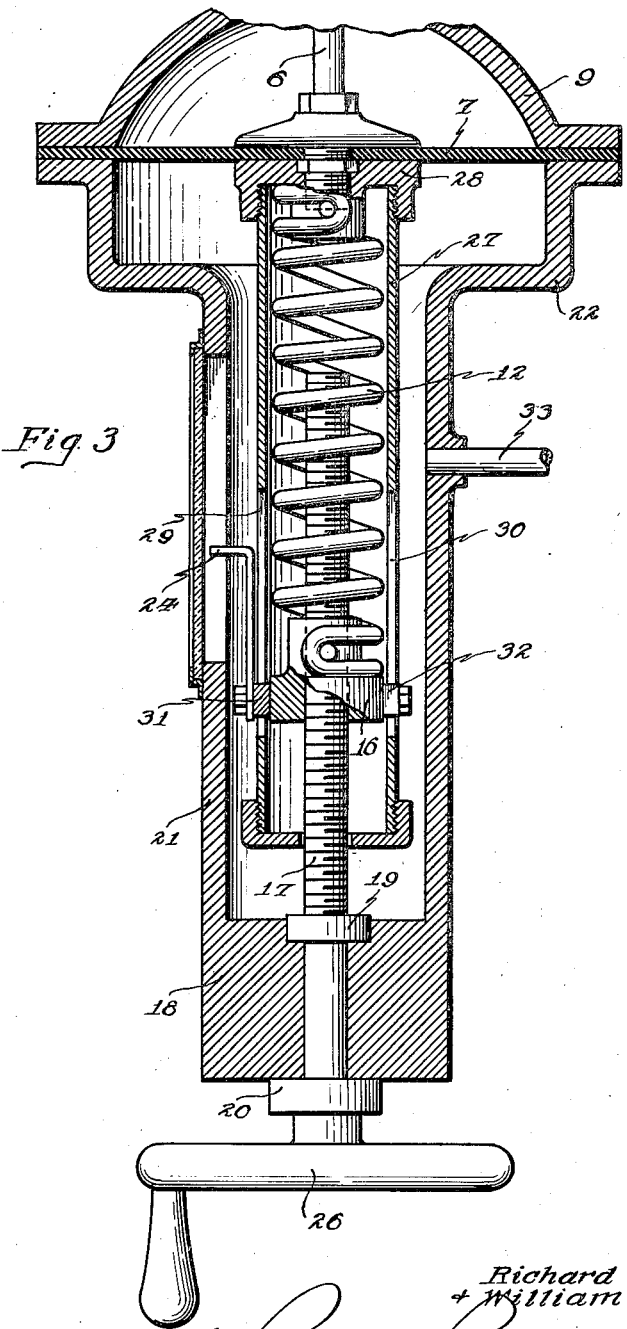

Patented May 18, 1937

2,080,666

UNITED STATES PATENT OFFICE 2,080,666

PRESSURE REGULATING VALVE

Richard W. Leutwiler, Chicago, and William Eichholz, Cicero, Ill., assignors to Illinois Engineering Company, Chicago, Ill., a corporation of Illinois Application February 15, 1936, Serial No. 63,938

3 Claims. (Cl. 50—23)

This invention relates to manually adjustable floating diaphragm valve constructions.

The objects of the invention are to provide a simplified and improved regulator which is manually adjustable to produce any desired reduced pressure at the low-pressure side of the valve either above, at or below atmospheric pressure and is automatically operable to maintain the required pressure at the low-pressure side of the valve; further purposes of the invention are to provide such a valve construction with a positive shutoff, and with an improved indicating means for showing the setting of the valve for maintaining the delivery side thereof at some predetermined pressure above, at or below atmospheric pressure.

The objects of the invention are accomplished by means of the constructions illustrated in the drawings, wherein:

Fig. 3 is an enlarged sectional view similar to Fig. 2 but showing an added improvement for providing a positive shut-off connection between the valve and the differential pressure regulating wheel.

Figures 1, 2:
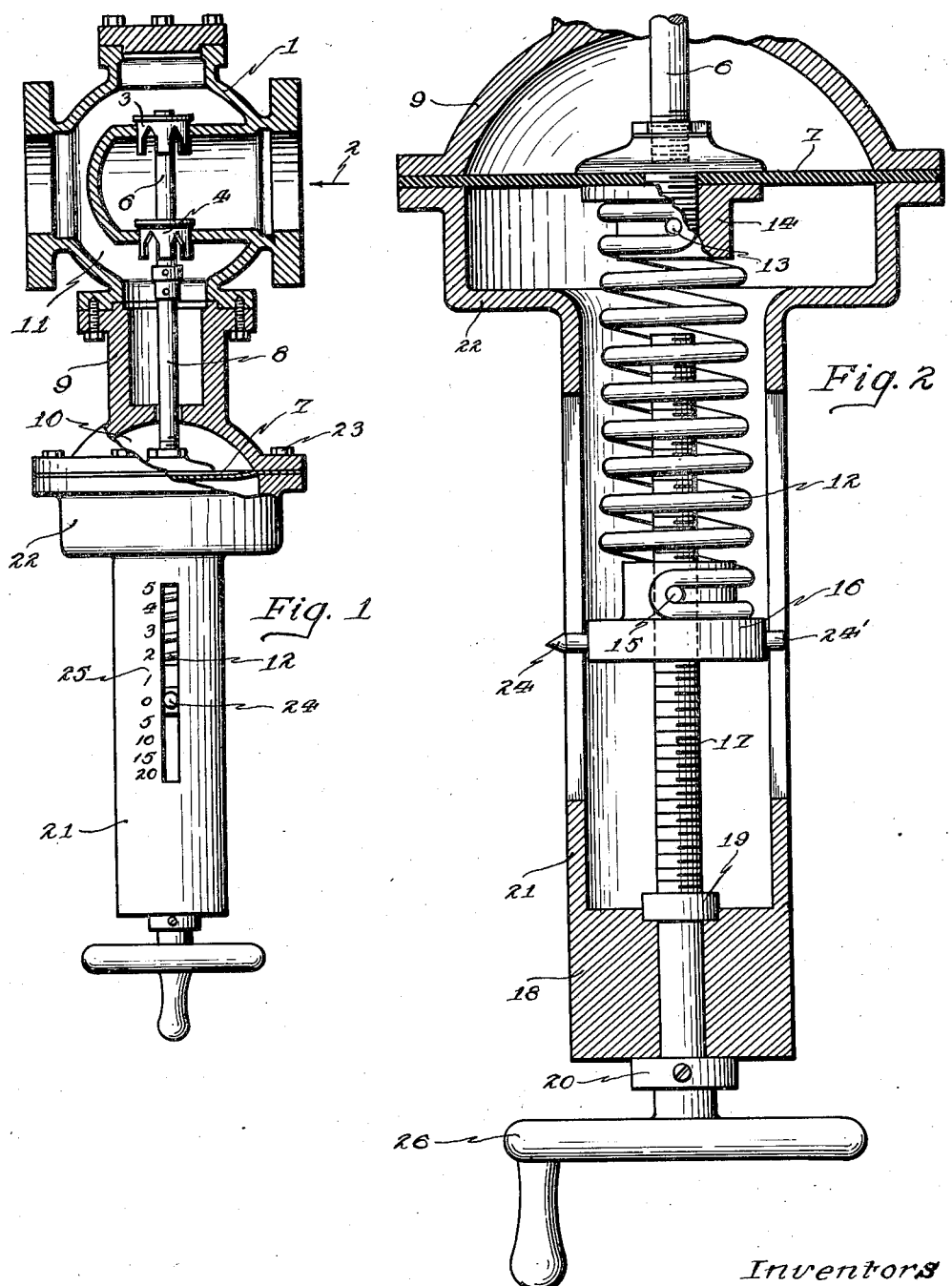
Figure 1 is a view partly in section and partly in elevation of the improved diaphragm valve construction.
Fig. 2 is an enlarged vertical section of the lower half of the construction shown in Fig. 1.

The invention provides a unitary construction for performing functions that are usually taken care of by separate appliances and which are not so easily set for operation above, at and below atmospheric pressure.

This device may be quickly set for the maintenance on the delivery side of the valve, for example of 20, 15, 10 or 5 inches of vacuum, zero, or 1, 2, 3, 4, or 5 pounds pressure, when the pressure on the inlet side is greater than the desired outlet pressure.

The improvements are provided for by adding to a standard diaphragm valve construction, a housing for a spring which is attached to the diaphragm and means for adjusting the spring manually, to place the spring either under compression or tension depending upon whether the pressure operating against one face of the diaphragm, which is in communication with the low pressure side of the valve body, is above or below atmospheric pressure. The spring is attached at one end of the diaphragm and at its opposite end to a shiftable element which may carry an indicator for showing whether the spring is under compression or tension, and the amount of such forces or resultant effect on the diaphragm and valve according to the opposed pressure exerted on the diaphragm on the low pressure side thereof. This spring adjusting collar has threaded engagement with a screw which may be manually rotated preferably by means of a hand wheel. The adjusting collar has limited free motion under the action of the screw with reference to a means engaged thereby for positively actuating the valve to wide open or fully closed positions, but may, near the limits of its motion, engage such means and positively shift the valve to its wide open position or to its fully closed position. Thus this improved valve-operating means is a highly convenient device for regulating steam delivery to attain variable differential pressures between the inlet and outlet sides of the valve, and to enable the operator to adjust the reduced pressure either above, at or below atmospheric pressure by a single manipulative means.

The construction as illustrated in the drawings includes a well-known type of balanced valve, Fig. 1. The direction of steam flow through the valve body is indicated by the arrow 2. The valves 3 and 4 fixed on the stem 6 are shown as nearly fully seated and the diaphragm 7 attached to extension 8 of the valve stem 6 is shown flexed in the direction required for seating the valves. The hollow support 9 for diaphragm 7 provides a chamber 10 on one side of the diaphragm which is in communication with the low pressure side 11 of the valve body. The force on the opposite side of the diaphragm either plus or minus is provided for by spring 12. This spring is attached at one end through the pin 13 with the diaphragm clamping nut 14 and at its opposite end is attached through pin 15 with a slide collar 16 having threaded engagement with a screw 17. A bearing for the screw 17 is shown at 18 between the collars 19 and 20 on the screw. This bearing is a part of a tubular spring housing 21 depending from the diaphragm clamping member 22 which is drawn into clamping position by the bolts 23 in casting 9. The collar 16 is prevented from turning on the screw by the trunnions 24 and 24', the former serving as a pointer for a scale 25 which indicates the setting of spring 12. The screw 17 is turned to compress or tension spring 12 by means of hand wheel 26 which is fastened to the screw.

In Figure 3 the corresponding elements which are shown in Fig. 2 are indicated by like numerals but this figure shows an additional auxiliary housing 27 for the spring 12, which housing is carried by the diaphragm clamping nut 28 and thus moves with the diaphragm and valves and is capable of imparting movement to the valves. The auxiliary spring housing has slots 29 and 30 through which the trunnions 31 and 32 extend and this spring housing may be engaged at the ends of the slots at the limits of motion of collar 16 for the purpose of transmitting movement from screw 17 to the valves 3 and 4, for positively opening and closing the valves whenever the hand wheel 26 is rotated far enough for directly effecting the setting of the valves. All of the intermediate positions of the valve or valves are determined by the opposed pressures on diaphragm 7 plus the force of spring 12 in one direction or the other.

Figure 3 also serves to illustrate how the regulator is adaptable for maintaining a fixed differential between the high and low pressure sides of the valve in which case, instead of having atmospheric pressure below diaphragm 7, the housing 21 is closed and a different pressure than atmospheric is communicated to the space within spring housing 21 by a conduit 33. This conduit may lead to the high pressure side of the valve body 1 or to some other source of pressure.

When either of the constructions illustrated is used under conditions of operation, wherein there is less than atmospheric pressure on the low pressure side of the valve, there is as usual some type of vacuum producer employed in the system for reducing the fluid pressure in the piping and upper side of the diaphragm to the point to which it is desired to admit steam.

In the operation of the improved construction as above described, valves 3 and 5 may be set wide open or fully closed by turning the screw 17, Fig. 3, as far as it will go either in the closing or opening direction or the valve may float intermediate these positions according to any desired difference in pressure, within the range of the device, between the high and low pressure sides of the valve. For example, if the pressure of the steam is several pounds above atmospheric pressure on the high pressure side of the valve, and it is desired to maintain two pounds on the low pressure side, irrespective of normal fluctuations on the high pressure side, the screw is operated so that the pointer 24 indicates the numeral 2 on the outside of the spring housing 21.

The valve is substantially balanced and accordingly is not materially affected by changes in pressure on the high or low pressure sides thereof, but the low pressure side 11 of the valve body is in communication with the chamber 10 on one side of diaphragm 7 and hence exerts an influence on the position of the diaphragm, and accordingly the valves, in opposition to the action of spring 12, which is under compression and tends to unseat the valves and will move the valves accordingly upon a drop below two pounds pressure at the point 11. When this pressure is again built up to the extent of two pounds the diaphragm 7 flexes sufficiently against the action of spring 12 to reduce the flow through the valve to that required to maintain the two pounds on the low pressure side thereof.

In case of operation under conditions of partial vacuum and assuming that the collar 16 is adjusted to tension the spring to the extent that the pointer 24 indicates ten inches on scale 25, the operation of the valve is exactly the same as when operating above atmospheric pressure conditions and floats to maintain the ten inches of vacuum on the low pressure side of the valve.

We claim:

1. A regulator of the class described comprising a valve body, a valve movable therein, a diaphragm attached to the valve, a housing for the diaphragm in communication with the low pressure side of said valve body for the purpose of transmitting such pressure to one side of the diaphragm, a spring for exerting an opposing pressure on the opposite side of said diaphragm, said spring being secured at one end to said diaphragm, means secured to the opposite end of said spring arranged for either tensioning or compressing said spring, and an element operable by said means for positively operating the valve.

2. In a regulator of the class described, the combination with a valve body, diaphragm support and housing, of a unit movably mounted in said body and housing and comprising a valve, valve stem, diaphragm, and a tubular spring enclosing element; a coil spring within said element and attached to said movable unit at one end, a spring tensioning or compressing member to which the opposite end of said spring is attached, a shaft having threaded engagement with said spring tensioning member, a bearing for said shaft arranged to prevent axial motion thereof, means for rotating said shaft for the purpose of tensioning or compressing the spring through said spring adjusting member, and a lost motion connection between said spring adjusting member and spring enclosing tube whereby after a limited spring adjusting movement of said member it may positively move the tube, diaphragm, and valve unit to either hold the valve open or closed irrespective of the effect of said spring.

3. In a regulator of the class described, the combination with a valve body, diaphragm support and housing, of a unit movably mounted in said body and housing and comprising a valve, valve stem, diaphragm, and tubular spring enclosing element; a coil spring within said element and attached to said movable unit at one end, a spring tensioning or compressing member to which the opposite end of said spring is attached, a shaft having threaded engagement with said spring tensioning member, a bearing for said shaft arranged to prevent axial motion thereof, means for rotating said shaft for the purpose of tensioning or compressing the spring through said spring adjusting member, and a lost motion connection between said spring adjusting member and spring enclosing tube whereby after a limited spring adjusting movement of said element it may positively move the tube, diaphragm, and valve unit to either hold the valve open or closed irrespective of the effect of said spring, and an indicator carried by said spring adjusting member for the purpose of disclosing the extent of compression or tension of the spring and whether the valve is positively held shut or open.

RICHARD W. LEUTWILER.
WILLIAM EICHHOLZ.